United States Patent [19]
Rowe

[11] Patent Number: 5,493,314
[45] Date of Patent: Feb. 20, 1996

[54] CONTINUOUS LOOP MOUSE

[76] Inventor: David G. Rowe, 12901 Cedar St., Leawood, Kans. 66209

[21] Appl. No.: 319,659

[22] Filed: Oct. 7, 1994

Related U.S. Application Data

[62] Division of Ser. No. 237,439, May 3, 1994, Pat. No. 5,442,377.

[51] Int. Cl.$^6$ ........................................... G09G 3/02
[52] U.S. Cl. ........................... 345/156; 345/157; 345/184
[58] Field of Search .................................. 345/157, 158, 345/156, 163, 167, 184, 145; 74/471 XY; 273/478; 341/20, 21

[56] References Cited

U.S. PATENT DOCUMENTS

| | | | |
|---|---|---|---|
| 4,404,865 | 9/1983 | Kim | 74/471 XY |
| 4,933,670 | 6/1990 | Wislocki | 345/167 |
| 4,952,919 | 8/1990 | Nippoldt | 345/167 |
| 4,982,618 | 1/1991 | Culver | 74/471 XY |
| 5,270,690 | 12/1993 | Oberg | 345/163 |

*Primary Examiner*—Tommy P. Chin
*Assistant Examiner*—Kara A. Farnandez
*Attorney, Agent, or Firm*—Richard P. Stitt

[57] ABSTRACT

A continuous loop multi-axis pointing position control device is provided permitting continuous rotation about an X-axis to provide generation of a first motion signal and a continuous rotation about a Y-axis to provide generation of a second motion signal to enable directional control of a cursor or pointing device on a computer screen and to substitute for track ball, joystick and mouse control devices.

4 Claims, 5 Drawing Sheets

CONTINUOUS LOOP MOUSE

This application is a division of application Ser. No. 08/237,439, filed May 3, 1994, U.S. Pat. No. 5,442,377.

BACKGROUND OF THE INVENTION

A number of computer screen cursor or pointing control devices have been developed in recent years which allow the user of a device, in particular computers, to selectively position the cursor or pointing device in use at any X,Y coordinate pair on a computer screen or plotting device or any such graphical display.

Typical of the devices previously available is the trackball-type mechanism shown in U.S. Pat. No. 4,404,865 to Kim, U.S. Pat. No. 4,933,670, to Wislocki and U.S. Pat. No. 4,952,919 to Nippoldt. The central feature of these type devices is the use of an individual sphere which is supported on bearings permitting rotation of the sphere in any direction about a central axis. Motion detection devices are biased against the sphere which permit detection of sphere movement. The detected sphere movement is converted into X-axis and Y-axis components which are then utilized to reposition a pointing device or a cursor.

It has also been typical of this art to invert the trackball mechanism permitting the sphere to be suspended from the bottom of a housing. The sphere or trackball is then rotated by movement of the housing about a suitable surface capable of providing frictional contact with the trackball. Movement of the housing then generates movement of the trackball which is then communicated to the pointing device or the computer screen. This form of trackball control device is typically referred to as a mouse.

The trackball-type device and the mouse-type device present a number of problems to computer users and in particular users of portable or laptop computers. The mouse-type control device presents the drawback of requiring a surface of adequate size to permit movement of the mouse about an area sufficient to direct the cursor into all areas of the computer screen. If the space available is of insufficient size it is necessary to lift the mouse from the surface and reposition it in order to continue to move the mouse in the selected direction to achieve complete movement of the cursor or pointer across the entirety of the computer screen or plotter device. The unavailability of such sufficient surface area during travel has prompted increased use of the trackball-type device with portable computers.

Typically the trackball device is attached to the edge of the portable computer keyboard or embedded in some central location of the portable computer keyboard or included in a wand-type device which may be held by the user in order to rotate the trackball. While the trackball-type devices do not require the surface space necessary for movement of the mouse-type device, the trackball-type devices do present a small active control surface area for contact with the thumb or other digit of a user in order to achieve rotation of the trackball. The small surface area of the trackball often requires an increase in the ratio between the actual movement of the trackball and the movement of the cursor on the screen in order to move the cursor from top-to-bottom or left-to-right on the screen without an inordinate number of rotations of the trackball.

This can lead to very rapid and jumpy movement of the cursor or pointer and the inability to achieve fine control of the cursor position on the computer screen. An additional problem found with mouse-type devices and with side-mounted trackball devices is that the hand of the computer user must be taken from the keyboard in order to actuate the mouse or trackball. This tends to slow operation of the computer and can represent a substantial inconvenience to the user when repositioning of the cursor or pointer is frequently necessary.

Recently attempts have been made to avoid the drawbacks of the conventional mouse and trackball-type devices by incorporating elongated bar-type devices at the base of the keyboard in order to permit a user to maintain keyboard hand position while utilizing the thumb to manipulate a cursor positioning bar. Examples of such bar-type repositioning devices may be found U.S. Pat. No. 4,982,618 to Culver and U.S. Pat. No. 5,270,690 to Oberg.

In the patent to Culver the bar control mechanism provides a continuous rotational type of movement as the bar is moved about its longitudinal axis. However, when the device of Culver is operated in the plane of its longitudinal axis it will come to a positive stop as the end of the rod contacts a structural obstacle such as the keyboard housing or the detector for movement in the plane of the longitudinal axis. This physical limitation of movement in the longitudinal axis of the device of Culver presents the requirement that the device be brought into registration with the computer screen size or plotter bed size so that when the lateral movement to either the left or right comes to a physical stop the cursor will have reached the full left or full right position on the computer screen. It will be appreciated that such a limitation on the movement of the control device will result in a limitation on the ratio of control device movement to cursor movement and that a 1:1 ratio between these parameters cannot be achieved and still maintain the rod structure within the confines of the keyboard housing or structure of the laptop computer.

The device of Oberg provides multiple longitudinally extending belts. However, each of these belts operates independently from one another and movement of one belt does not provide movement of the adjacent belts. Therefore, an operator of the device must select the particular belt which is in contact with the rotating wheel of Oberg, or more generally, the movement sensor, in order to effect movement of the cursor. Alternatively, if the operator selects the band of Oberg which is most convenient to the operator's thumb this band may not be in contact with the pickup wheel or rotating wheel of Oberg and movement of the band will communicate no information and achieve no response in the cursor or pointer.

Therefore, it may be seen that the need is present for a cursor or pointer control device which can take advantage of the limited space available in a computer keyboard or laptop computer case to provide a user with a large surface contact area proximate to the hand while in the typing position and which offers an uninterrupted or continuous path of travel to permit selection any ratio of control device movement to cursor movement and to avoid any need to align the movement limits of the control device with the screen dimensions of a computer screen or other display device.

SUMMARY OF THE INVENTION

It is a principal object of the present invention to provide a multi-axis cursor or pointer control device which operates from a fixed location thereby avoiding the need to move the control device location to effect signal generation.

Another object of the present invention is to provide a multi-axis continuous loop or boundaryless input device for control of a pointer or cursor on computer screens and other graphical displays.

It is another object of the invention to provide a cursor or pointer control device which can effect a movement of the cursor or pointer without the need for user selection of a portion of the control device which is contacting the movement sensor of the control device.

Yet another object of the invention is to provide a multi-axis continuous loop device for control of pointer or cursor thereby avoiding the need to align the control device range of operation with the extreme limits of the computer screen or plotter bed in order to provide for a full range of cursor or pointer motion within the movement limits of the control device.

Another object of the invention is to provide a fixed location multi-axis pointer or cursor control device which provides a user with a large active control surface area in comparison to conventional such devices.

The foregoing and other objects are not intended in a limiting sense, as will be readily evident upon a study of the following specification and accompanying drawings comprising a part thereof.

DETAILED DESCRIPTION OF THE PREFERRED EMBODIMENTS

Figure 1:
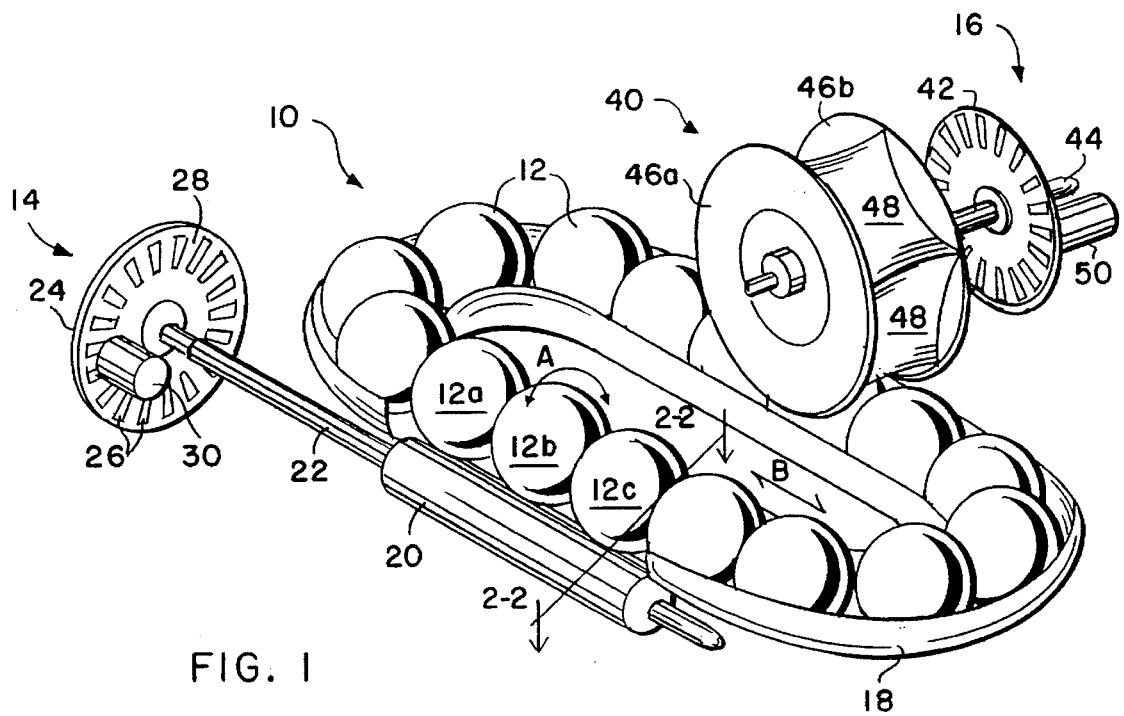
FIG. 1 is a front and right side perspective view of an embodiment having a continuous loop of adjacent spheres with the support cover remover for clarity.

Referring now to FIG. 1, the continuous loop or boundaryless-type control device 10 is shown in an embodiment utilizing a loop of abutting spheres 12. Spheres 12 are independent of each other and may individually be rotated in the directions indicated by arrow A or may be rolled or pushed in either direction indicated by arrow B in order to generate movement of spheres 12 which is then communicated to the vertical movement sensing means 14 or horizontal movement sensing means 16. It will be appreciated by those skilled in the art that the sphere movement in the directions indicated by arrows A, B conforms to naturally anticipated responses for the cursor or plotter repositioning. For example, movement in either direction indicated by arrow B produces a horizontal of the cursor on a computer screen or other such pointer device. Movement of a particular sphere 12a–c in the directions indicated by arrow A produces a vertical movement in the cursor of the computer screen or plotter. Spheres 12 are held in a support track 18 which is in the form of an elongated circle. Support 18 may have its shape varied to any number of circular forms in order to best conform to the space available in the keyboard or other device into which it is incorporated such as the wrist rest shown in FIG. 4. It is only necessary that support track 18 be sized to maintain abutment between spheres 12 such that sphere movements, particularly in the directions indicated by arrow B, are communicated to adjoining spheres 12 without interstitial spaces between spheres 12 dampening the transfer of movement from a first sphere 12 to the adjoining sphere 12. The avoidance of such dampening of the applied force is preferred in order to provide rapid and accurate motion of horizontal movement sensing means 16.

Still referring to FIG. 1, it may be seen that spheres 12a–c rest upon and are in contact with pickup roller bearing 20. Roller bearing 20 rotates about its longitudinal axis in response to movement of spheres 12a–c in the directions indicated by arrow A. The movement received by roller bearing 20 is then communicated by rod 22 to a rotation sensor 24. In the embodiment shown in FIG. 1, rotation sensor or counter 24 is a wheel having indicia 26 uniformly spaced about surface 28 of rotation sensor 24. Various rotation to electrical signal transducers may be utilized as are conventional in the art. A discussion of the construction and operation of three such transducers has been described, generally, in U.S. Pat. No. 4,933,670 to Wislocki and is incorporated herein by reference. Indicia 26 may be of any type conventionally known in this art which operate to make indicia 26 distinguishable from surface 28 when contacted by detector 30. For example, indicia 26 could be magnetic strips or light emitting diodes or voids or non-conductive material in order to provide the distinction between indicia 26 and surface 28. Detector 30 need simply be responsive to indicia 26 in order to generate a signal which may be processed and communicated to the cursor or pointing device to achieve movement of the cursor. A movement sensing means 14, 16 of the type indicated in FIG. 1 is generally preferred for use in cursor pointer control devices as changes in direction can be quickly detected as well as changes in acceleration in the movement in order to provide greater response and sensitivity in the control of the cursor or pointing device.

Figure 2:
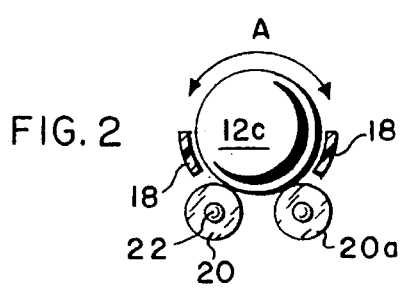
FIG. 2 is a cross-sectional view of FIG. 1 along line 2—2 showing rollers contacting a sphere for supporting the sphere and for detecting sphere rotational movement.
Figure 3:
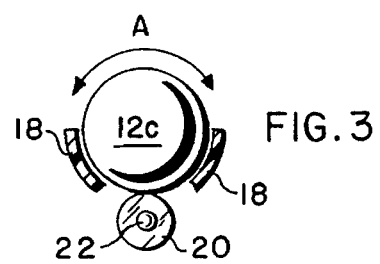
FIG. 3 is a cross-sectional view of FIG. 1 along line 2—2 an showing an alternative single roller configuration for sphere support and movement detection.

Referring now to FIG. 2 and FIG. 3, cross-sectional views along line 2—2 of FIG. 1 are shown. In FIG. 2 sphere 12 is supported by two roller bearings 20, 20a. In this configuration roller bearing 20 of FIG. 2 is attached to vertical movement sensing means 14 and roller bearing 20a is provided for support of sphere 12. In FIG. 3, a configuration is shown which relies only on a single roller bearing 20 to both support sphere 12 and to receive the movement of sphere 12 in the direction indicated by arrow A.

It will be appreciated by those familiar with cursor control devices that these devices are exposed to dirt and dust and should contain a means for expulsion of such material which may enter the control device. Expulsion of such debris is provided in the embodiment of FIGS. 1–5 through the opening in support track 18 which permits contact between roller bearing 20 and spheres 12. As debris is encountered by the control device it tends to move to the lower regions of support tract 18 and is allowed to fall past roller bearing 20 and through window 36 thus freeing control device 10 of matter which could interfere with its operation.

Figure 5:
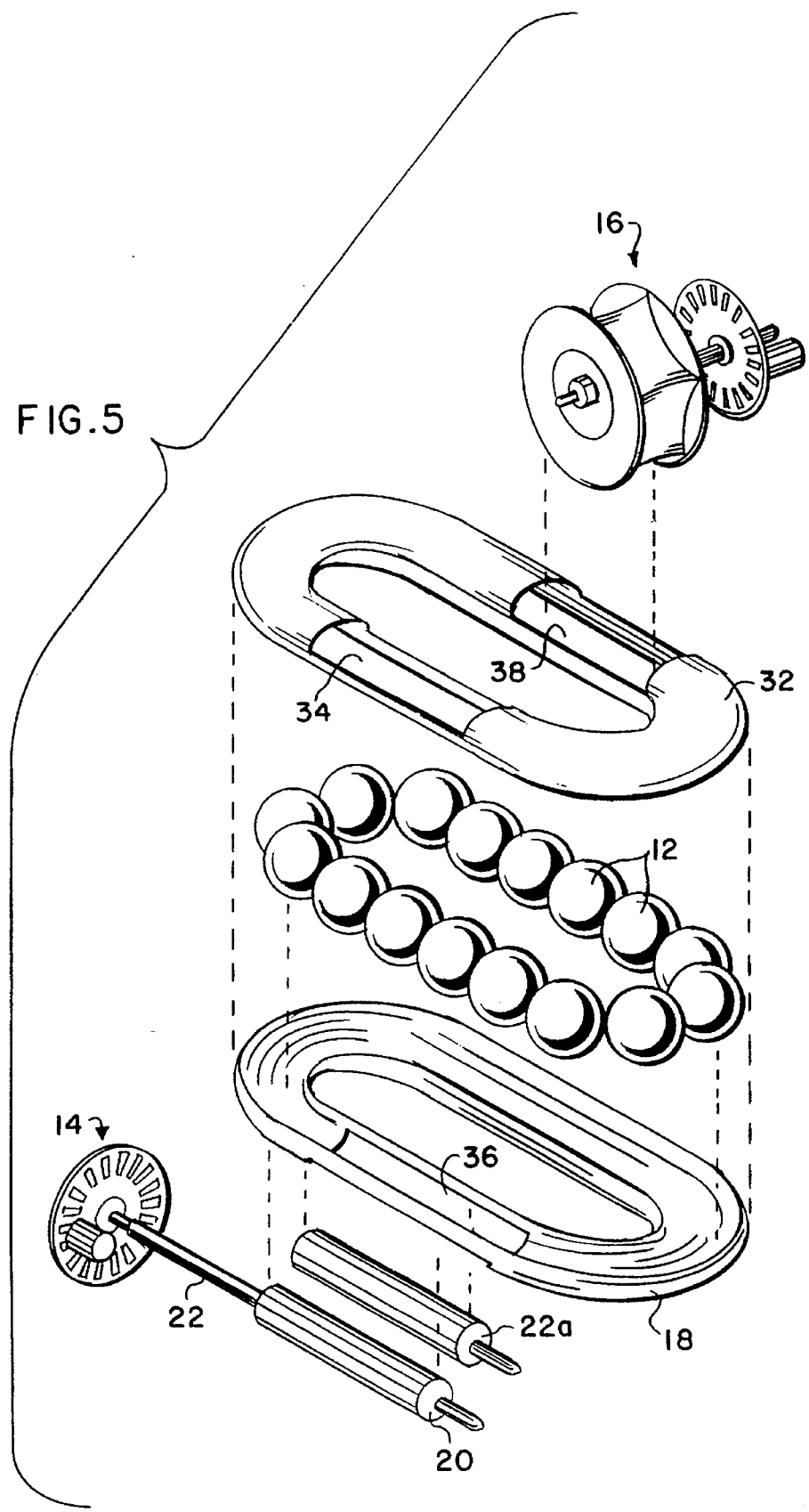
FIG. 5 is an exploded view of the embodiment of FIG. 1 with the support cover included.

Referring now to FIG. 5, an exploded view of the embodiment of FIG. 1 is shown which includes support cover 32 which was eliminated from FIG. 1 for clarity. Windows 34, 36 and 38 permit user access to spheres 12 and communication of sphere movement to detection devices 14, 16. Control window 34 is provided in support cover 32 of control device 10 so the upper surfaces of spheres 12a–c may be manipulated by a user in order to apply lateral and rotational forces on spheres 12. Directly below control window 34 is vertical pick-up window 36 which permits contact between spheres 12 and pick-up roller bearing 20 and idler roller bearing 20a. Vertical pick-up window 36, as previously described, also permits debris to escape from control device 10. Alternatively, or in addition to vertical pick-up window 36, a groove in the bottom support track 18 may be included to allow debris to fall through support track 18 at all points.

Referring again to FIG. 1, horizontal movement sensing means 16 is shown positioned above spheres 12 so spheres 12 may contact pick-up drum 40 as spheres 12 are moved in either direction indicated by arrow B. Horizontal movement sensing means 16 relies upon rotational sensor or counter 42 which is similar in construction to previously described rotational sensor or counter 24 of vertical movement sensing means 14. Motion of spheres 12 in the directions of arrow B are communicated to rotational sensor 42 by pick-up drum 40. As spheres 12 are moved in the directions of arrow B spheres 12 engage pick-up drum 40 by passing between walls 46a, 46b of drum 40 and frictionally engaging cup or depression 48 of drum 40. As spheres 12 pass by pick-up drum 40 rotation of pick-up drum 40 occurs and this rotation is then communicated to rotational sensor or counter 42 by rod 44 connected therebetween.

In the fashion described for vertical movement sensing means 14 and detector 30 thereof, detector 50 of horizontal movement sensing means 16 serves to detect the movement in rotational sensor 42 and this detected movement may then be converted via electronic processing which is standard in the art into signals for generating left and right horizontal movement in a cursor or plotting device to which detector 50 communicates.

Figure 4:
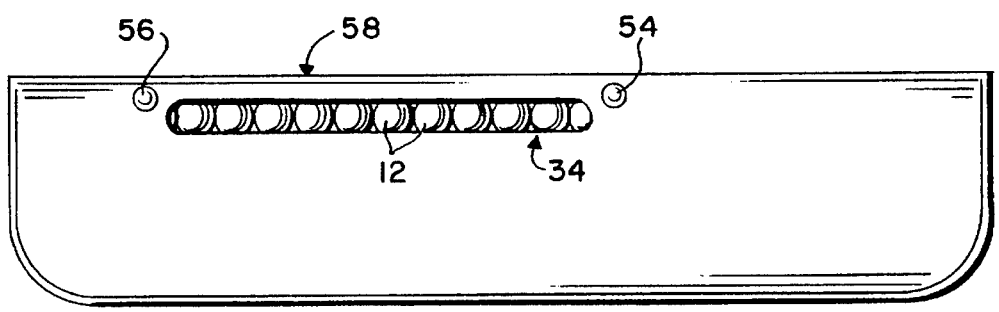
FIG. 4 is a top plan view of a wrist support device and presenting the embodiment of FIG. 1 adapted to operate therein.

Referring now to FIG. 4, a typical computer keyboard wrist rest is shown having the control device of FIGS. 1–5 incorporated therein. In a typical wrist rest 52, edge 58 is placed adjacent the edge of the keyboard closest to the user. In this configuration window 34 and spheres 12 are generally positioned adjacent and parallel to the space bar of the standard keyboard. In this manner a user may maintain contact with the keyboard and simply move either thumb downward to contact spheres 12 within window 34 to achieve cursor movement by pushing spheres 12 in the directions indicated by arrows A, B of FIG. 1. In addition wrist rest 52 has been provided with signal buttons 54, 56 which are utilized in the same fashion as conventional signal buttons on trackball or mouse-type devices. Signal buttons 54, 56 may be positioned as shown in FIG. 4 or adjusted to any other convenient space on wrist rest 52. Alternatively one of signal buttons 54, 56 may be spring biased against the bottom of rods 22, 22a of FIG. 5 such that a downward pressure applied to spheres 12a–c operates signal buttons 54, 56.

Figure 6:
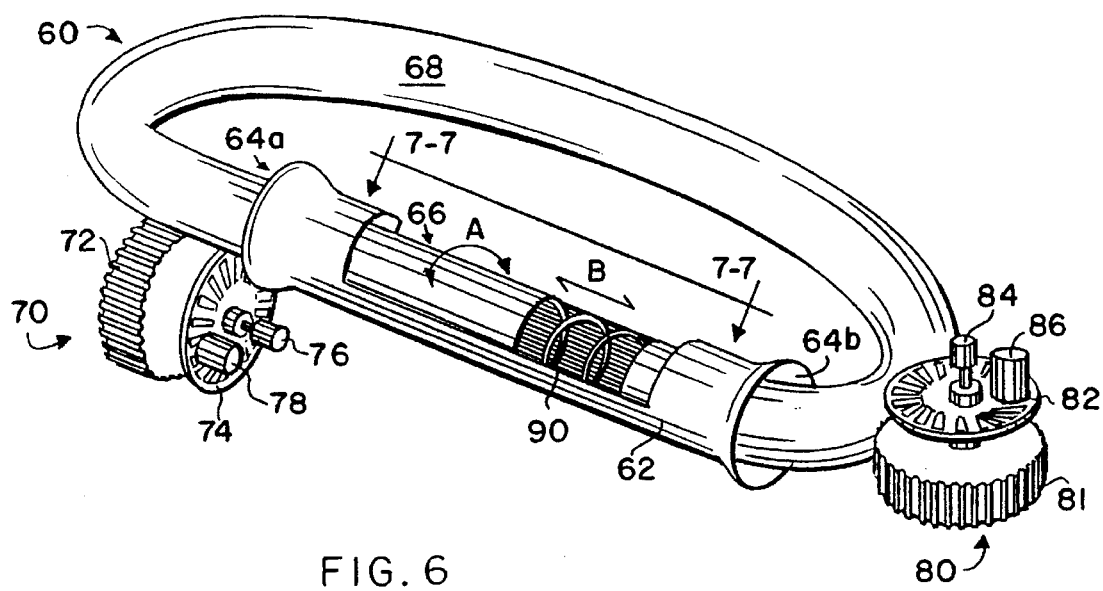
FIG. 6 is a front and right side perspective view of a flexible continuous band embodiment of the present invention passing through a support cylinder housing and having a segment of the continuous band covering removed to reveal the internal band tensioner.
Figure 7:
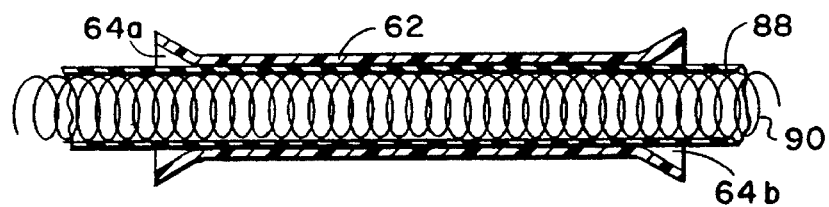
FIG. 7 is a cross-sectional view along line 7—7 of FIG. 6 showing the continuous band with the support cylinder.
Figure 8:
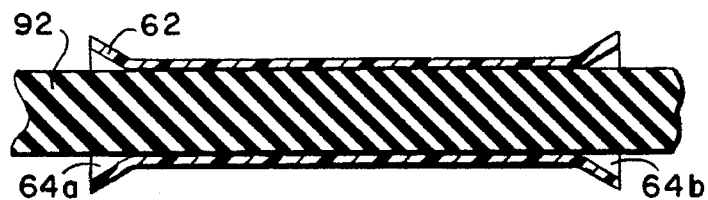
FIG. 8 is a cross-sectional view along line 7—7 of FIG. 6 showing a solid cross-sectional embodiment of the continuous band within the support cylinder.

Referring now to FIGS. 6–8, an alternative embodiment of a continuous loop or boundaryless-type control device is shown. In FIG. 6 a continuous band-type device 60 is shown passing through support tube 62 by way of openings 64a, 64b. Support tube 62 has a section of its upper body removed to form control window 66. When continuous loop device 60 is placed within a housing of any type a user can access band 68 through control window 66 in order to move band 68 in the directions indicated by arrows A, B. A user can control the vertical movement in a cursor or pointer by rotating band 68 in the directions indicated by arrow A. Movement in the directions of arrow A produces a rotational movement in band 68 which is communicated by the band vertical sensing means 70. Vertical sensing means 70 is comprised of frictional take-off wheel 72 which is rotated in response to movements in band 68 in the directions indicated in arrow A. The movements generated in take-off wheel 72 are then communicated to rotational sensor or counter 74 by rod 76. As described for the embodiment of FIGS. 1–5, movement of rotational sensor 74 is then received by detector 78 which, in conventional manner, detects the movement of rotational sensor or counter 74 and converts the detected movement into electronic signals for communication to the computer cursor or other device.

When a user wishes to move the cursor or plotter along the horizontal axis, band 68 is pushed in the directions indicated by arrow B and a movement in horizontal sensing means 80 is produced. Horizontal sensing means 80 operates in the same manner as vertical sensing means 70 and communicates the movement of band 68 to rotational sensor or counter 82 via rod 84. The rotation of sensor 82 is then received by detector 86 which measures the rotation of sensor 82 and produces a signal for communication to the cursor or plotter to effect its repositioning along its horizontal axis.

Referring now to FIGS. 6 and 7, the construction of band 68 will be described. In FIG. 6 a portion of band 68 within control window 66 has been removed to reveal the interior of band 68. In the embodiment of FIGS. 6 and 7, band 68 is comprised of a flexible covering 88 enclosing a tensioner 90. This construction serves to provide band 68 with a high degree of flexibility while maintaining sufficient rigidity in band 68 so as to resist the applied pressure of a user and avoid dampening of user applied pressure to band 68 prior to creation of movement in take-off wheel 72, 81. In FIG. 7 it may be seen that openings 64a, 64b of support tube 62 are flared to provide smooth egress and ingress of band 68 as it slides through tube 62.

Referring now to FIG. 8, an alternative construction of band 68 is shown. In the embodiment of FIG. 8 band 68 is a solid flexible material such as rubber or plastic. This solid configuration dispenses with tensioner 90 of FIGS. 6 and 7 as the solid core of flexible band 92 provides sufficient resilience to resist user applied pressure.

Again referring to FIG. 6, it will be appreciated that take-off wheels 72, 81 of vertical sensing means 70 and horizontal sensing means 80 are biased against band 68 in order to create sufficient frictional contact to fully detect band 68 movements in directions A, B without slippage occurring and without creation of undue resistance against band 68 thus requiring a user to apply inconvenient amounts of pressure against band 68 in order to achieve movement of band 68.

Another alternative embodiment is shown in FIGS. 9–12 wherein the continuous loop or boundaryless control device comprises a cylinder having multiple bands mounted thereon. The flexible bands can be operated by a user to communicate horizontal movement to the control device or cursor and the entire cylinder supporting the flexible bands can be rotated to communicate vertical movements in the cursor.

Figure 9:
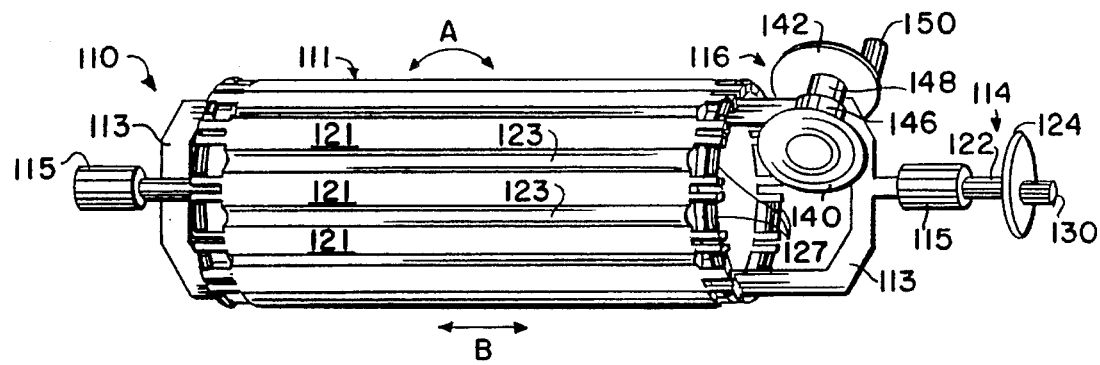
FIG. 9 is a front and right side perspective view of a cylindrical embodiment of the continuous loop having a grooved cylinder for supporting a plurality of movable continuous bands for communication of X-axis movement to a display or recording device and the rotational movement of the cylinder providing communication of Y-axis movement instructions to a display or recording device.
Figure 10:
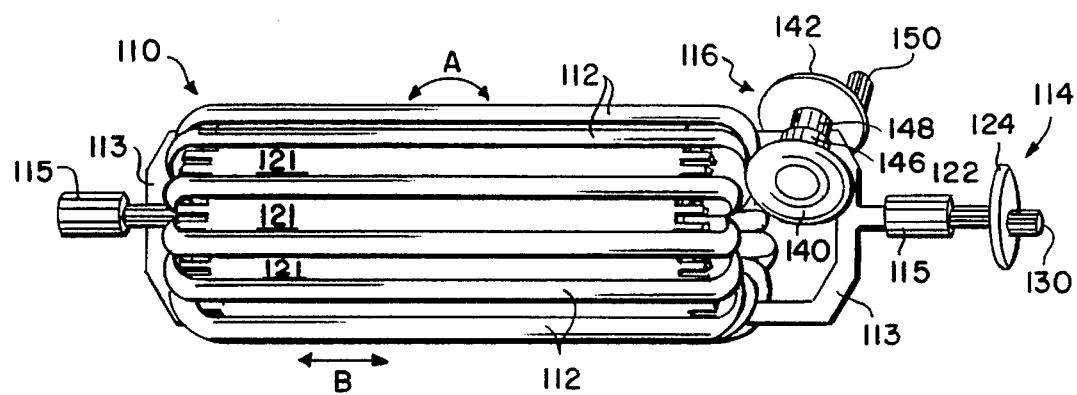
FIG. 10 is a front and right side perspective view of the embodiment of FIG. 9 with the continuous bands in position on the cylinder.
Figure 10A:
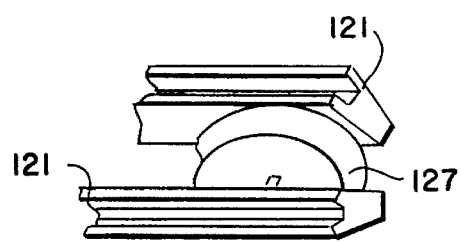
FIG. 10A is an enlarged fragmentary perspective view of two of the spacing shims having a band roller mounted therebetween.

Referring now to FIGS. 9, 10 and 10A, control device 110 is comprised of a cylindrical skeleton 111 upon which multiple flexible bands 112 (FIG. 10) are mounted parallel to the longitudinal axis skeleton 111. Skeleton 111 is composed of concavities 123 and guide rails 121 which serve to maintain flexible bands 112 in parallel position. At either end of concavities 123 are rollers 127 (FIG. 10A) over which flexible bands 112 pass. Rollers 127 serve to assist flexible band 112 in freely moving along the length of skeleton 111.

Still referring to FIGS. 9 and 10, skeleton 111 is suspended on support frame 113 which is attached at either end to bearings 115 to permit rotation of cylinder skeleton 111 about its longitudinal axis as indicated by directional arrow A. User rotation of cylinder skeleton 111 on support frame 113 is communicated to vertical movement sensing means 114 by rod 122 which is connected to rotation sensor 124. The rotational movement of sensor 124 is then determined by detector 130 which provides a signal for electronic processing and execution of cursor movement.

Referring now to FIG. 10, flexible bands 112 are shown in place on skeleton 111. Flexible bands 112 may be pushed in the directions indicated by arrow B along the longitudinal axis of cylindrical skeleton 111. This sliding movement of band 112 is used to communicate to the cursor the horizontal displacement in either of directions B which the user desires. As will be explained in detail hereinafter, the sliding of flexible band 112 causes rotation in pick-up wheel 140 of horizontal movement sensing means 116. This rotation of pick-up wheel 140 is then communicated by rod 148 to rotational sensor 142 where it is quantified by detector 150.

Horizontal sensing means 116 is mounted on support frame 113 by bearing 146. Horizontal sensing means 116 is in constant contact with the flexible band 112 which is adjacent to pick-up wheel 140. However, as is described hereinafter, all of flexible bands 112 are in communication with each other as a result of the abutment of the bands inside support skeleton 111. Any movement in the directions of arrow B (FIG. 10) by any one of flexible bands 112 is communicated to all other of flexible bands 112 and thereby to the particular flexible band 112 which is adjacent and in contact with pick-up wheel 140 of horizontal sensing means 116. This communication of movement between flexible bands 112 permits a user of control device 110 to operate any of flexible bands 112 which are proximate the hand and still communicate the band movement to horizontal movement to pick-up wheel 140 and to sensing means 116 for detection.

Figure 11:
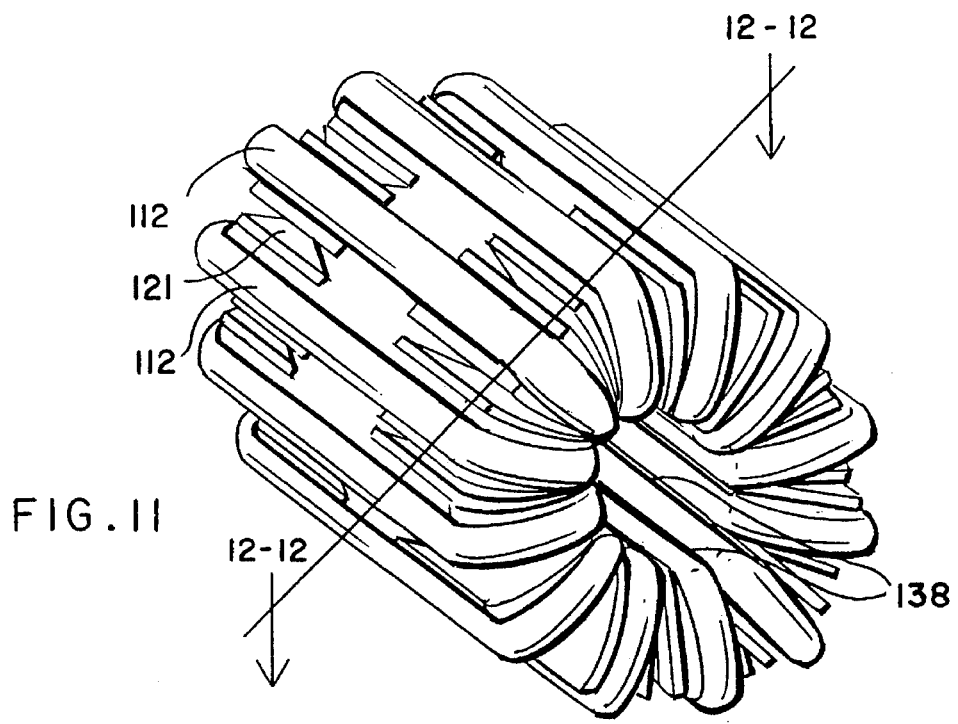
FIG. 11 is a front and right side perspective view of the embodiment of FIG. 10 with the detectors and support structure removed for clarity and showing the abutting contact points of the bands within the center of the cylinder.
Figure 12:
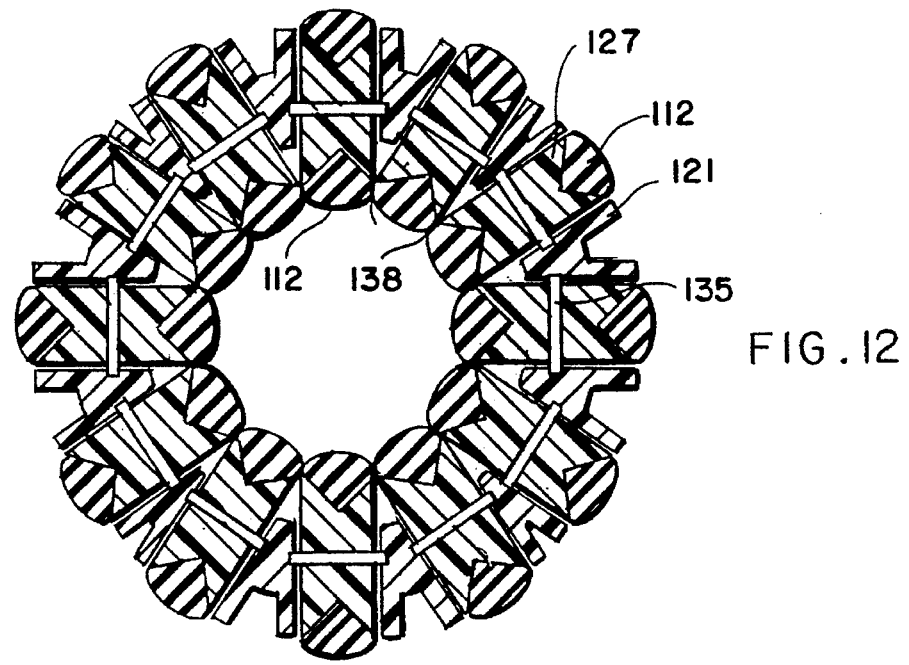
FIG. 12 is a cross-sectional view along line 7—7 of FIG. 11 showing the bands in place on the cylinder skeleton and the spacing shims between the band rollers and the band contact points.

Referring now to FIGS. 11 and 12 the relationship of flexible bands 112 and horizontal sensing means 116 will be described. As shown in FIG. 11, flexible bands 112 are mounted along the longitudinal axis of cylinder skeleton 111 (FIG. 9) and are spaced apart by a wedge shaped configuration of ridge 121. As may be seen in FIG. 12, this provides separation between flexible bands 112 on the exterior of cylinder 111 while permitting each band 112 to contact adjacent bands 112 within the center of cylinder 111. This abutment of bands 112 occurs at contact point 138. The abutment between bands 112 within the interior of cylinder 111 permits communication of force applied to the exterior of any one band 112 to the other bands 112 on cylinder 111 and permits all bands 112 to move in unison in response to an applied user force along the directions of arrow B (FIGS. 9, 10).

Referring to FIG. 12, the separation between bands 112 provided by the wide portion of wedge 121 on the exterior of cylinder 111 and the abutment of bands 112 at contact point 138 on the interior of cylinder 111 is shown. As previously indicated this frictional fit between bands 112 at contact point 138 communicates the movement of one band 112 to the other bands 112. This also assures the communication of movement in the directions of arrow B by any one band 112 to horizontal rotational pick-up wheel 140 which moves along the outer edges of bands 112 (FIG. 10) as cylinder 111 is rotated in the directions of arrow A in response to the repositioning of cylinder 111 during the communication of vertical movement by a user. Also shown in FIG. 12 is axle 135 on which roller 127 moves during the lateral shifting of bands 112. The components of cylinder skeleton 111 may be composed of plastic or any suitable lightweight material.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense. It is also to be understood that the following claims are intended to cover all the generic and specific features of the invention, and all statements of the scope of the invention which, as a matter of language, might be said to fall therebetween.

Having thus described the invention, what is claimed as new and desired to be secured by Letters Patent is as follows:

1. A position control device comprising:

an annular flexible band, a housing for supporting said band said housing permitting application of generally lateral forces and rotational forces on said band, a lateral movement sensing means in communication with said band for receiving and detecting said applied lateral forces on said band, a rotational movement sensing means in communication with said band for receiving and detecting said applied rotational force on said band, means responsive to said lateral and rotational sensing means for communicating a signal to effect repositioning of a computer cursor.

2. The device as claimed in claim 1 wherein said rotational movement sensing means is a counter for quantifying the rotation of said band.

3. The device as claimed in claim 1 wherein said lateral movement sensing means is a counter for quantifying the lateral movement of said band.

4. The device as claimed in claim 1 wherein said means responsive to said detected lateral and rotational forces generates an electronic signal to accomplish repositioning of a computer cursor.

* * * * *